(12) United States Patent
Liu et al.

(10) Patent No.: US 12,301,358 B2
(45) Date of Patent: May 13, 2025

(54) TRANSPORT BLOCK SIZE DETERMINATION FOR SIDELINK SLOT AGGREGATION

(71) Applicant: QUALCOMM Incorporated, San Diego, CA (US)

(72) Inventors: Guangyi Liu, Shanghai (CN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/869,644

(22) Filed: Jul. 20, 2022

(65) Prior Publication Data

US 2024/0031063 A1 Jan. 25, 2024

(51) Int. Cl.
*H04L 1/00* (2006.01)
*H04L 1/08* (2006.01)
*H04W 72/0446* (2023.01)
*H04W 72/20* (2023.01)

(52) U.S. Cl.
CPC ............. *H04L 1/08* (2013.01); *H04L 1/0004* (2013.01); *H04W 72/0446* (2013.01); *H04W 72/20* (2023.01)

(58) Field of Classification Search
None
See application file for complete search history.

(56) References Cited

U.S. PATENT DOCUMENTS

| 11,057,870 B2* | 7/2021 | Huang | H04L 1/1887 |
| 11,178,578 B2* | 11/2021 | Huang | H04W 72/0446 |
| 2016/0226626 A1* | 8/2016 | Dayanandan | H04L 69/324 |
| 2021/0037468 A1* | 2/2021 | Huang | H04W 76/14 |
| 2024/0305419 A1* | 9/2024 | Su | H04L 1/0061 |

FOREIGN PATENT DOCUMENTS

WO   WO-2021035580 A1 *  3/2021  ........... H04L 1/1896

* cited by examiner

*Primary Examiner* — Ajit Patel
(74) *Attorney, Agent, or Firm* — Holland & Hart / QUALCOMM Incorporated

(57) ABSTRACT

Methods, systems, and devices for wireless communications are described. The described techniques provide for techniques for signaling a transport block format of a retransmitted transport block of a slot aggregated packet. In response to receiving a negative acknowledgment (NACK) from a second user equipment (UE) for a transport block of a slot aggregated packet, a first UE may transmit a sidelink control information (SCI) message to the second UE indicating a transport block format for a retransmission of the transport block. Accordingly, the second UE may accurately determine a size and format of the retransmitted transport block. The first UE may retransmit the transport block in accordance with the indicated transport block format, and the second UE may decode the retransmitted transport block in accordance with the indicated format of the retransmitted transport block.

30 Claims, 10 Drawing Sheets

TRANSPORT BLOCK SIZE DETERMINATION FOR SIDELINK SLOT AGGREGATION

FIELD OF TECHNOLOGY

The following relates to wireless communications, including transport block size determination for sidelink slot aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transport block size determination for sidelink slot aggregation. For example, the described techniques provide for techniques for signaling a transport block format of a retransmitted transport block of a slot aggregated packet. In response to receiving a negative acknowledgment (NACK) from a second user equipment (UE) for a transport block of a slot aggregated packet, a first UE may transmit a sidelink control information (SCI) message to the second UE indicating a transport block format for a retransmission of the transport block. Accordingly, the second UE may accurately determine a size and format of the retransmitted transport block. The transport block size may refer to the number of bits included in a transport block. The first UE may retransmit the transport block in accordance with the indicated transport block format, and the second UE may decode the retransmitted transport block in accordance with the indicated format of the retransmitted transport block.

A method for wireless communications at a first UE is described. The method may include transmitting, to a second UE, a slot aggregated packet, receiving, from the second UE, feedback indicating unsuccessful reception of a transport block of the slot aggregated packet, transmitting, to the second UE and based on the feedback, an SCI message indicating a transport block format for a retransmission of the transport block, and transmitting, to the second UE, the retransmission of the transport block in accordance with the transport block format.

An apparatus for wireless communications at a first UE is described. The apparatus may include a processor, memory coupled with the processor, and instructions stored in the memory. The instructions may be executable by the processor to cause the apparatus to transmit, to a second UE, a slot aggregated packet, receive, from the second UE, feedback indicating unsuccessful reception of a transport block of the slot aggregated packet, transmit, to the second UE and based on the feedback, an SCI message indicating a transport block format for a retransmission of the transport block, and transmit, to the second UE, the retransmission of the transport block in accordance with the transport block format.

Another apparatus for wireless communications at a first UE is described. The apparatus may include means for transmitting, to a second UE, a slot aggregated packet, means for receiving, from the second UE, feedback indicating unsuccessful reception of a transport block of the slot aggregated packet, means for transmitting, to the second UE and based on the feedback, an SCI message indicating a transport block format for a retransmission of the transport block, and means for transmitting, to the second UE, the retransmission of the transport block in accordance with the transport block format.

A non-transitory computer-readable medium storing code for wireless communications at a first UE is described. The code may include instructions executable by a processor to transmit, to a second UE, a slot aggregated packet, receive, from the second UE, feedback indicating unsuccessful reception of a transport block of the slot aggregated packet, transmit, to the second UE and based on the feedback, an SCI message indicating a transport block format for a retransmission of the transport block, and transmit, to the second UE, the retransmission of the transport block in accordance with the transport block format.

In some examples of the method, apparatuses, and non-transitory computer-readable medium described herein, transmitting the SCI message may include operations, features, means, or instructions for transmitting the SCI message including a bit indicating whether an initial transport block format of the slot aggregated packet includes one or more control channels, where a transport block size of the transport block in the retransmission may be based on the bit indicating whether the initial transport block format includes the one or more control channels.

In some examples of the method, apparatuses, and non-transitory computer-readable medium described herein, the one or more control channels include one or more of a sidelink control channel, a sidelink control channel demodulation reference signal, and a second stage SCI transmission.

In some examples of the method, apparatuses, and non-transitory computer-readable medium described herein, transmitting the SCI message may include operations, features, means, or instructions for transmitting the SCI message including a bit indicating an absence of one or more control channels in an initial transport block format of the slot aggregated packet, and where a transport block size of the transport block in the retransmission may be based on the absence of the one or more control channels.

In some examples of the method, apparatuses, and non-transitory computer-readable medium described herein, transmitting the SCI message may include operations, features, means, or instructions for transmitting the SCI message including a bit indicating a size of one or more control channels of an initial transport block format of the slot aggregated packet, where a transport block size of the transport block in the retransmission may be based on the size of one or more control channels of the initial transport block format of the slot aggregated packet.

In some examples of the method, apparatuses, and non-transitory computer-readable medium described herein, transmitting the SCI message may include operations, features, means, or instructions for transmitting the SCI message including a bit indicating whether an initial transport block format of the slot aggregated packet includes an automatic gain control symbol, where a transport block size of the transport block in the retransmission may be based on whether the initial transport block format of the slot aggregated packet includes the automatic gain control symbol.

In some examples of the method, apparatuses, and non-transitory computer-readable medium described herein, transmitting the SCI message may include operations, features, means, or instructions for transmitting the SCI message including a bit indicating whether an initial transport block format of the slot aggregated packet includes a gap symbol, where a transport block size of the transport block in the retransmission may be based on whether the initial transport block format of the slot aggregated packet includes the gap symbol.

In some examples of the method, apparatuses, and non-transitory computer-readable medium described herein, transmitting the SCI message may include operations, features, means, or instructions for transmitting the SCI message including a bit indicating whether an initial transport block format of the slot aggregated packet includes a sidelink feedback channel, where a transport block size of the transport block in the retransmission may be based on whether the initial transport block format of the slot aggregated packet includes the sidelink feedback channel.

In some examples of the method, apparatuses, and non-transitory computer-readable medium described herein, transmitting the SCI message may include operations, features, means, or instructions for transmitting the SCI message including a bit indicating a number of demodulation reference signals in an initial transport block format of the slot aggregated packet.

In some examples of the method, apparatuses, and non-transitory computer-readable medium described herein, transmitting the SCI message may include operations, features, means, or instructions for transmitting the SCI message including one bit indicating a configuration for the transport block format, the configuration indicating two or more of whether an initial transport block format of the slot aggregated packet includes one or more control channels, whether the initial transport block format of the slot aggregated packet includes an automatic gain control symbol, whether the initial transport block format of the slot aggregated packet includes a gap symbol, and whether the initial transport block format of the slot aggregated packet includes a sidelink feedback channel.

Some examples of the method, apparatuses, and non-transitory computer-readable medium described herein may further include operations, features, means, or instructions for transmitting, to the second UE, control signaling indicating one or more configurations, where the one or more configurations include the configuration.

In some examples of the method, apparatuses, and non-transitory computer-readable medium described herein, transmitting the SC message may include operations, features, means, or instructions for transmitting the SCI message including an indication of a second modulation and coding scheme order associated with the retransmission of the transport block, where a first modulation and coding scheme order may be associated with the slot aggregated packet.

A method for wireless communications at a second UE is described. The method may include receiving, from a first UE, a slot aggregated packet, transmitting, to the first UE, feedback indicating unsuccessful reception of a transport block of the slot aggregated packet, receiving, from the first UE and at least in part in response to the feedback, an SCI message indicating a transport block format for a retransmission of the transport block, and receiving, from the first UE, the retransmission of the transport block in accordance with the transport block format.

An apparatus for wireless communications at a second UE is described. The apparatus may include a processor, memory coupled with the processor, and instructions stored in the memory. The instructions may be executable by the processor to cause the apparatus to receive, from a first UE, a slot aggregated packet, transmit, to the first UE, feedback indicating unsuccessful reception of a transport block of the slot aggregated packet, receive, from the first UE and at least in part in response to the feedback, an SCI message indicating a transport block format for a retransmission of the transport block, and receive, from the first UE, the retransmission of the transport block in accordance with the transport block format.

Another apparatus for wireless communications at a second UE is described. The apparatus may include means for receiving, from a first UE, a slot aggregated packet, means for transmitting, to the first UE, feedback indicating unsuccessful reception of a transport block of the slot aggregated packet, means for receiving, from the first UE and at least in part in response to the feedback, an SCI message indicating a transport block format for a retransmission of the transport block, and means for receiving, from the first UE, the retransmission of the transport block in accordance with the transport block format.

A non-transitory computer-readable medium storing code for wireless communications at a second UE is described. The code may include instructions executable by a processor to receive, from a first UE, a slot aggregated packet, transmit, to the first UE, feedback indicating unsuccessful reception of a transport block of the slot aggregated packet, receive, from the first UE and at least in part in response to the feedback, an SCI message indicating a transport block format for a retransmission of the transport block, and receive, from the first UE, the retransmission of the transport block in accordance with the transport block format.

In some examples of the method, apparatuses, and non-transitory computer-readable medium described herein, receiving the SCI message may include operations, features, means, or instructions for receiving the SCI message including a bit indicating whether an initial transport block format of the slot aggregated packet includes one or more control channels, where a transport block size of the transport block in the retransmission may be calculated in accordance with the bit indicating whether the initial transport block format of the slot aggregated packet includes one or more control channels.

In some examples of the method, apparatuses, and non-transitory computer-readable medium described herein, the one or more control channels include one or more of a sidelink control channel, a sidelink control channel demodulation reference signal, and a second stage SCI transmission.

In some examples of the method, apparatuses, and non-transitory computer-readable medium described herein, receiving the SCI message may include operations, features, means, or instructions for receiving the SCI message including a bit indicating an absence of the one or more control channels in an initial transport block format of the slot aggregated packet, and where a number of sidelink shared channel resources in the transport block format used to calculate a transport block size of the transport block in the retransmission may be based on the absence of the one or more control channels.

In some examples of the method, apparatuses, and non-transitory computer-readable medium described herein, receiving the SCI message may include operations, features, means, or instructions for receiving the SCI message including a bit indicating a size of one or more control channels of an initial transport block format of the slot aggregated packet, where a transport block size of the transport block in the retransmission may be calculated based on the size of one or more control channels of the initial transport block format of the slot aggregated packet.

In some examples of the method, apparatuses, and non-transitory computer-readable medium described herein, receiving the SCI message may include operations, features, means, or instructions for receiving the SCI message including a bit indicating whether an initial transport block format of the slot aggregated packet includes an automatic gain control symbol, where a transport block size of the transport block in the retransmission may be calculated based on whether the initial transport block format of the slot aggregated packet includes the automatic gain control symbol.

In some examples of the method, apparatuses, and non-transitory computer-readable medium described herein, receiving the SCI message may include operations, features, means, or instructions for receiving the SCI message including a bit indicating whether an initial transport block format of the slot aggregated packet includes a gap symbol, where a transport block size of the transport block in the retransmission may be calculated based on whether the initial transport block format of the slot aggregated packet includes the gap symbol.

In some examples of the method, apparatuses, and non-transitory computer-readable medium described herein, receiving the SCI message may include operations, features, means, or instructions for receiving the SCI message including a bit indicating whether an initial transport block format of the slot aggregated packet includes a sidelink feedback channel, where a transport block size of the transport block in the retransmission may be calculated based on whether the initial transport block format of the slot aggregated packet includes the sidelink feedback channel.

In some examples of the method, apparatuses, and non-transitory computer-readable medium described herein, receiving the SCI message may include operations, features, means, or instructions for receiving the SCI message including a bit indicating a number of demodulation reference signals in an initial transport block format of the slot aggregated packet.

In some examples of the method, apparatuses, and non-transitory computer-readable medium described herein, receiving the SCI message may include operations, features, means, or instructions for receiving the SCI message including one bit indicating a configuration for the transport block format, the configuration indicating two or more of: whether an initial transport block format of the slot aggregated packet includes one or more control channels, whether the initial transport block format of the slot aggregated packet includes an automatic gain control symbol, whether the initial transport block format of the slot aggregated packet includes a gap symbol, and whether the initial transport block format of the slot aggregated packet includes a sidelink feedback channel.

Some examples of the method, apparatuses, and non-transitory computer-readable medium described herein may further include operations, features, means, or instructions for receiving, from the first UE, control signaling indicating one or more configurations, where the one or more configurations include the configuration.

In some examples of the method, apparatuses, and non-transitory computer-readable medium described herein, receiving the SCI message may include operations, features, means, or instructions for receiving the SCI message including an indication of a second modulation and coding scheme order associated with the retransmission of the transport block, where a first modulation and coding scheme order may be associated with the slot aggregated packet.

DETAILED DESCRIPTION

Figure 1:
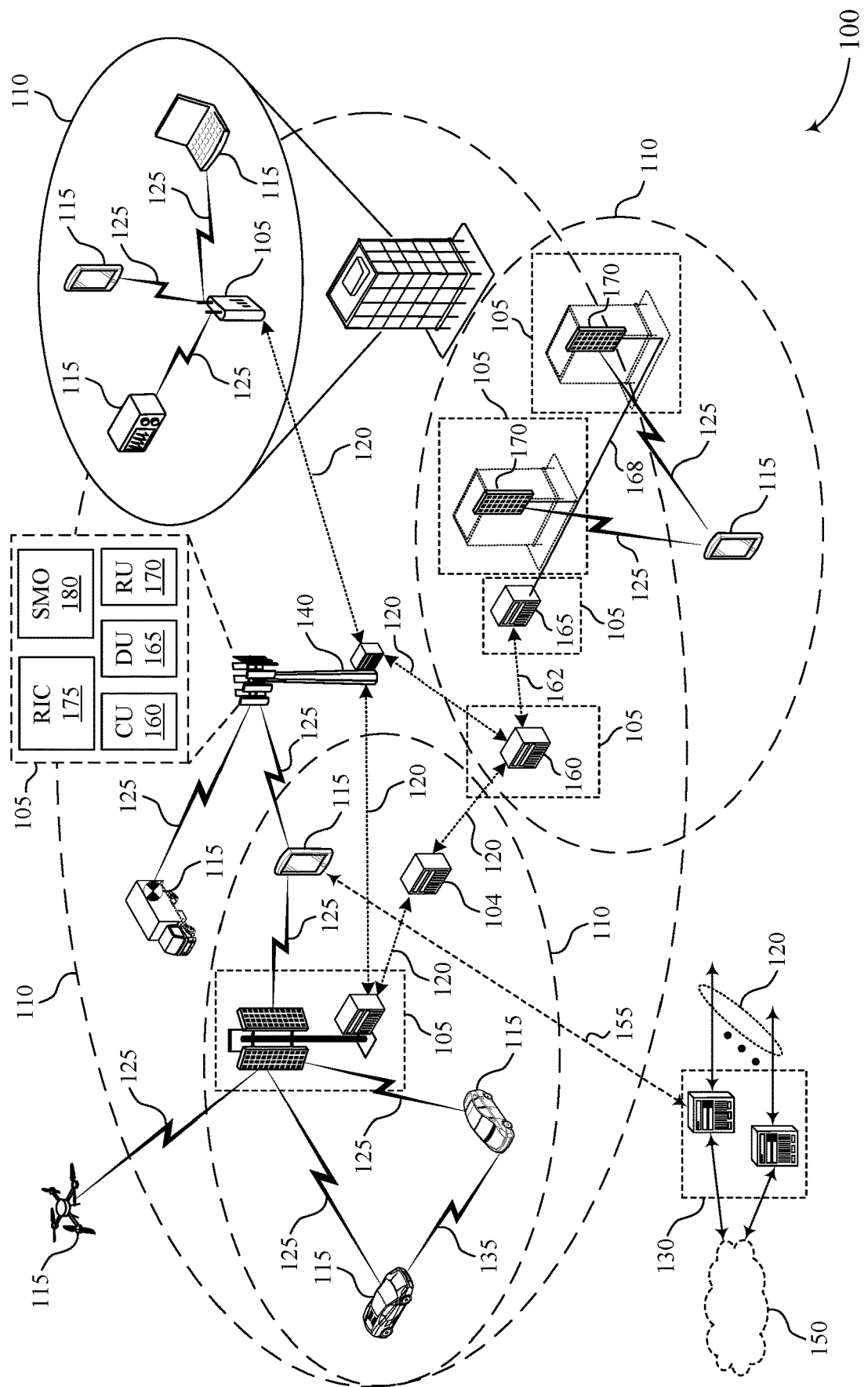
FIG. 1 illustrates an example of a wireless communications system that supports transport block size determination for sidelink slot aggregation in accordance with one or more aspects of the present disclosure.

Some wireless communications systems support sidelink communications between user equipments (UEs), such as mode 1 sidelink (e.g., network assisted sidelink) and mode 2 sidelink (e.g., autonomous sidelink where UEs coordinate scheduling among each other). In some cases, the wireless communications system may implement slot aggregation. For example, in sidelink communications, a transmitted packet (e.g., a slot aggregated packet) may span multiple slots, and control resources may be present in a first slot of the multiple aggregated slots but not in subsequent slots of the multiple aggregated slots. Slot aggregated packets may increase efficiency by reducing control overhead. In a slot aggregated packet, each slot may be one transport block or one code block group.

A first UE may transmit a slot aggregated packet to a second UE. In the case that the second UE does not successfully receive a transport block of the slot aggregated packet, the second UE may transmit a negative acknowledgment (NACK) for the transport block to the first UE. In response to the NACK, the first UE may retransmit the failed transport block to the second UE using a single slot. The transport block format of the retransmitted transport block in a single slot, however, may be different from the original transport block format of the slot aggregated packet because the single slot may include control resources. Current methods for determining the transport block size or format of a retransmitted transport block may be inaccurate. For example, if the second UE determines the size of a retransmitted transport block reusing the existing (e.g., initial) transport block format of the slot aggregated packet, the second UE may compute a false result (e.g., smaller that the real retransmitted transport block).

Aspects of the present disclosure relate to techniques for signaling a transport block format of a retransmitted transport block of a slot aggregated packet. In response to receiving a NACK from a second UE for a transport block of a slot aggregated packet, a first UE may transmit a sidelink control information (SCI) message to the second UE indicating (e.g., via one or more bits) a transport block format for a retransmission of the transport block. Accordingly, the second UE may accurately determine a size and format of the retransmitted transport block. The first UE may retransmit the transport block in accordance with the indicated transport block format, and the second UE may accurately decode the retransmitted transport block in accordance with the indicated and determined format of the retransmitted transport block.

In some examples, the SCI message may indicate whether the initial transport block format (e.g., the transport block format of the slot aggregated packet) includes one or more control channels, whether the initial transport block format includes an automatic gain control (AGC) symbol, whether the initial transport block format includes a gap symbol, and/or whether the initial transport block format includes a sidelink feedback channel. Based on the indication of whether the initial transport block format (e.g., the transport block format of the slot aggregated packet) includes one or more control channels, whether the initial transport block format includes an AGC symbol, whether the initial transport block format includes a gap symbol, whether the initial transport block format includes a sidelink feedback channel and which transport block is being retransmitted, the second UE may determine the transport block format of the retransmitted transport block. Accordingly, the second UE may accurately decode the retransmitted transport block in accordance with the indicated and determined format of the retransmitted transport block.

In some scenarios, a slot aggregated packet may include one code block group per slot (e.g., as compared to one transport block per slot). The same process described herein for retransmission of a transport block of a slot aggregated packets may be applied to retransmission of a code block group of a slot aggregated packet Aspects of the disclosure are initially described in the context of wireless communications systems. Aspects of the disclosure are further illustrated by and described with reference to slot aggregated packets and process flows. Aspects of the disclosure are further illustrated by and described with reference to apparatus diagrams, system diagrams, and flowcharts that relate to transport block size determination for sidelink slot aggregation.

FIG. 1 illustrates an example of a wireless communications system 100 that supports transport block size determination for sidelink slot aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transport block size determination for sidelink slot aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may implement slot aggregation. For example, in sidelink communications, a transmitted packet may span multiple slots, and control resources may be present in a first slot of the multiple aggregated slots but not in subsequent slots of the multiple aggregated slots. Slot aggregated packets may increase efficiency by reducing control overhead.

A first UE 115 may transmit a slot aggregated packet to a second UE 115. In the case that the second UE 115 does not successfully receive a transport block of the slot aggregated packet, the second UE 115 may transmit a NACK for the transport block to the first UE 115. In response to the NACK, the first UE 115 may retransmit the failed transport block to the second UE 115. The transport block format of the retransmitted transport block, however, may be different from the original transport block format of the slot aggregated packet because the retransmitted transport block may include control resources.

Accordingly, in response to receiving a NACK from a second UE 115 for a transport block of a slot aggregated packet, a first UE 115 may transmit an SCI message to the second UE 115 indicating a transport block format for a retransmission of the transport block. Accordingly, the second UE 115 may accurately determine a size and format of the retransmitted transport block. The first UE 115 may retransmit the transport block in accordance with the indicated transport block format, and the second UE 115 may accurately decode the retransmitted transport block in accordance with the indicated and determined format of the retransmitted transport block.

Figure 2:
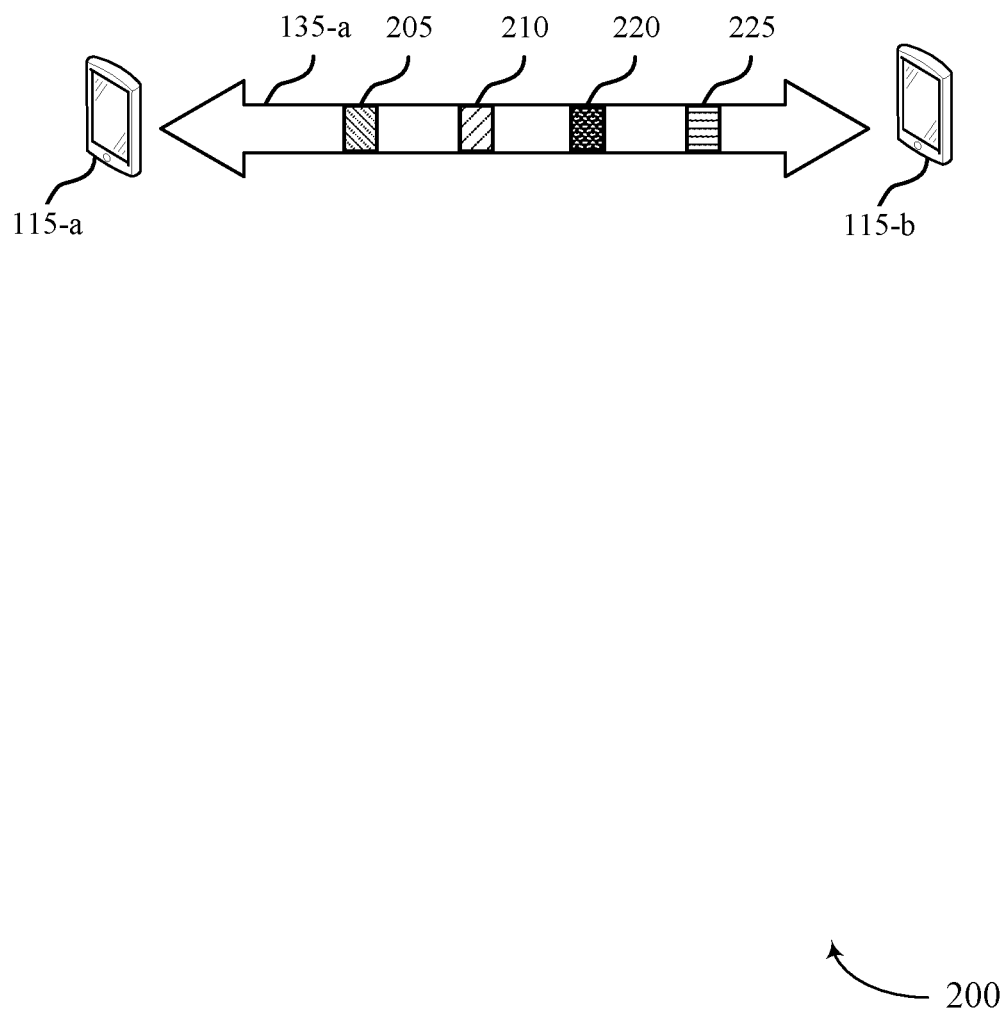
FIG. 2 illustrates an example of a wireless communications system that supports transport block size determination for sidelink slot aggregation in accordance with one or more aspects of the present disclosure.

FIG. 2 illustrates an example of a wireless communications system 200 that supports transport block size determination for sidelink slot aggregation in accordance with one or more aspects of the present disclosure. The wireless communications system 200 may include a first UE 115-a and a second UE 115-b, which may be examples of a UE 115 as described herein.

The first UE 115-a may communicate with the second UE 115-b using a sidelink communication link 135-a. The sidelink communication link 135-a may include bi-directional links that enable the first UE 115-a and the second UE 115-b to transmit and receive sidelink signals. In some examples (e.g., in Mode 1), the network (e.g., a serving network entity 105) may configure resources for the sidelink communication link 135-a. In some examples, the first UE 115-a and the second UE 115-b may communicate over the sidelink communication link 135-a using directional communications techniques (e.g., beamforming techniques). In some examples (e.g., in Mode 2), the first UE 115-a and the second UE 115-b may determine and configure the resources for the sidelink communication link 135-a autonomously (e.g., without involvement from a serving network entity 105).

The wireless communications system 200 may implement slot aggregation in sidelink communications. The first UE 115-a may transmit a slot aggregated packet 205 to the second UE 115-b. The second UE 115-b may transmit feedback (e.g., an acknowledgment (ACK) or a NACK) for each transport block or code block group in the slot aggregated packet 205. In the case that the second UE does not successfully receive a transport block (or code block group) of the slot aggregated packet, the second UE 115-b may transmit a NACK 210 for the transport block to the first UE 115-a. In response to the NACK, the first UE 115-a may transmit a retransmission of the transport block 225 to the second UE 115-b. The transport block format (or code block group format) of the retransmission of the transport block 225 (or code block group) may be different from the original transport block format (or code block group) of the slot aggregated packet because the retransmission of the transport block 225 (or code block group) may include control resources while the original transport block (or code block group) in the slot aggregated packet 205 may not have included control resources.

In response to receiving a NACK 210 from the second UE 115-b for a transport block (or code block group) of a slot aggregated packet 205, the first UE 115-a may transmit an SCI message 220 to the second UE 115-b indicating a transport block format (or code block group format) for the retransmission of the transport block 225. Accordingly, the second UE 115-b may accurately determine a size and format of the retransmission of the transport block 225 (or code block group). The first UE 115-a may transmit the retransmission of the transport block 225 (or code block group) in accordance with the indicated transport block format (or code block group format), and the second UE 115-b may accurately decode the retransmission of the transport block 225 (or code block group) in accordance with the indicated format of the retransmission of the transport block 225 (or code block group).

Figure 3:
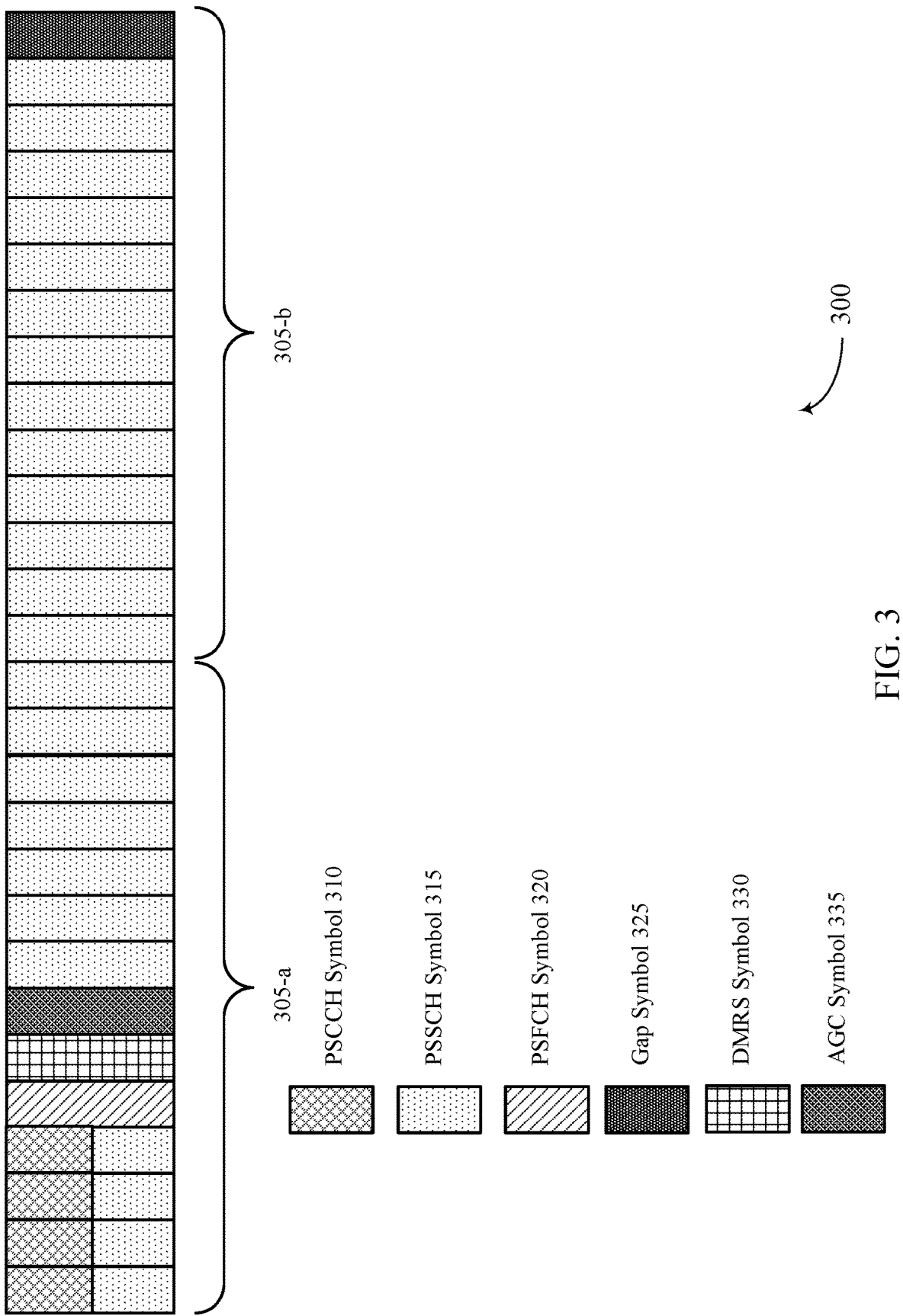
FIG. 3 illustrates an example of a slot aggregated packet that supports transport block size determination for sidelink slot aggregation in accordance with one or more aspects of the present disclosure.

FIG. 3 illustrates an example of a slot aggregated packet 300 that supports transport block size determination for sidelink slot aggregation in accordance with one or more aspects of the present disclosure. The slot aggregated packet 300 may be implemented by aspects of the wireless communications system 100 and 200. For example, the slot aggregated packet 300 may be implemented by one or more UEs 115.

As described herein, some wireless communications systems may implement slot aggregation in sidelink communications. For example, the slot aggregated packet 300 may span two slots, a first slot 305-a and a second slot 305-b. In the slot aggregated packet 300, control resources (e.g., physical sidelink control channel (PSCCH) symbols 310, demodulation reference signal (DMRS) symbols 330, AGC symbols 335, or physical sidelink feedback channel (PSFCH) symbols 320) may be present in a first slot of the multiple aggregated slots but not in subsequent slots of the multiple aggregated slots. Subsequent slots may include data symbols (e.g., physical sidelink shared channel (PSSCH) symbols 315). Slot aggregation may allow for elimination of gap symbols between slots. For example, as shown, the slot aggregated packet 300 includes a gap symbol 325 at the end of the second slot 305-b, but does not include a gap symbol between the first slot 305-a and the second slot 305-b. Slot aggregated packets may increase efficiency by reducing control overhead and thereby increasing the amount of data symbols (e.g., PSSCH symbols 315). In a slot aggregated packet, each slot (e.g., first slot 305-a and a second slot 305-b) may be each slot may be one transport block or one code block group. A transmitting UE 115 may indicate a number of slots that are aggregated (e.g., 1, 2, 4, 8 slots (corresponding to 0.5-4 ms in 30 kHz subcarrier spacing)) in an SCI-1 message. PSFCH symbols 320 may be configured with a period of 1, 2, or 4 slots, or may be fully disabled in the resources pool.

By eliminating control resources (e.g., PSCCH symbols 310, DMRS symbols 330, AGC symbols 335, or PSFCH symbols 320) and gap symbols between slots (e.g., the first slot 305-a and the second slot 305-b), a slot aggregated packet 300 may include more data bits in slots after the first slot 305-a. When retransmitting a slot after the first slot 305-a, for example when retransmitting a transport block or code block group corresponding to the second slot 305-b, the retransmission may include control resources and/or gap symbols not included in the original slot (e.g., second slot 305-b). Accordingly, to enable the receiving UE 115 to accurately decode the retransmitted transport block or code block group, the transmitting UE 115 may transmit an SCI message indicating a transport block format (or code block group format) of the retransmitted transport block (or code block group).

Figure 4:
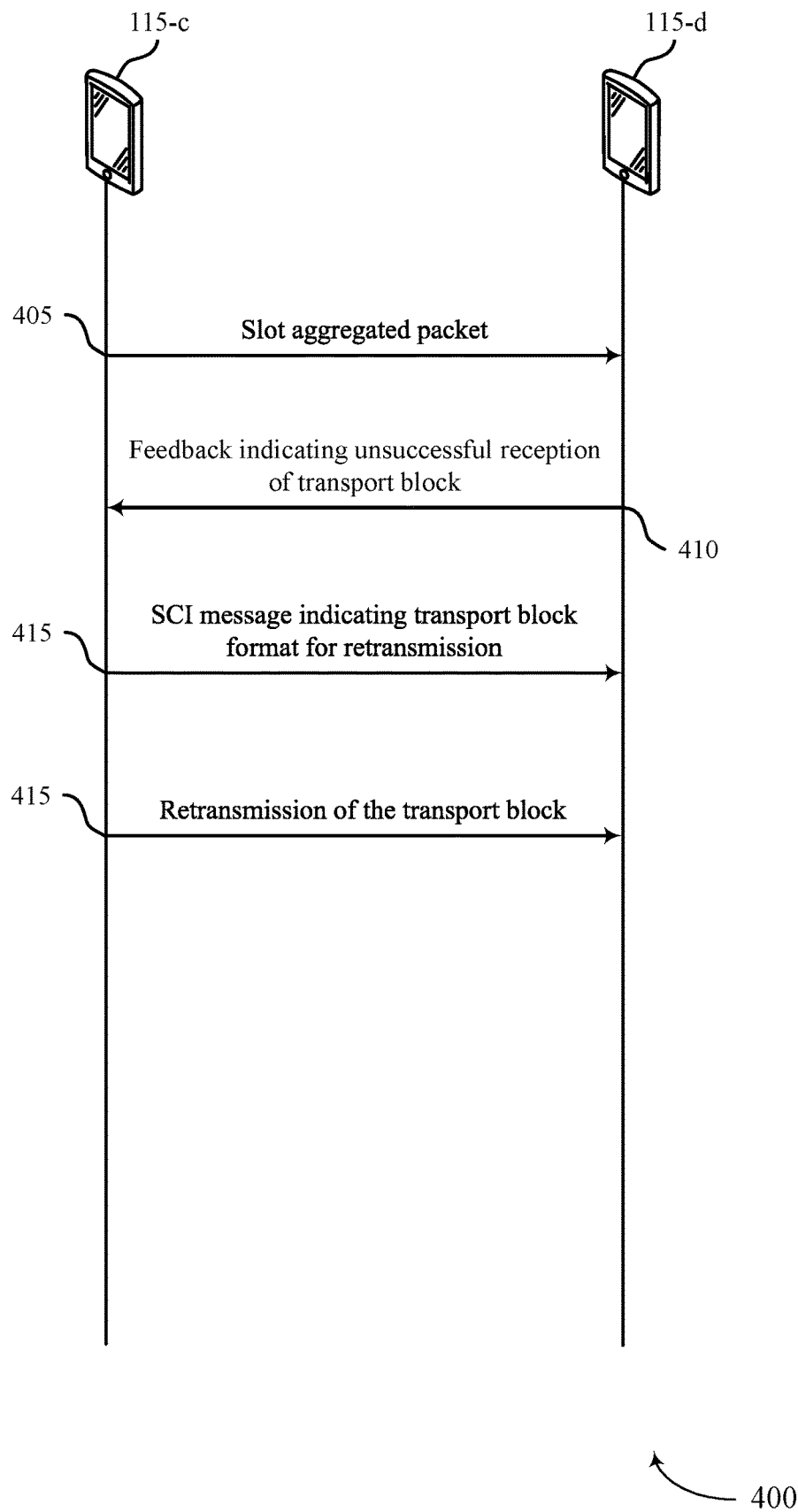
FIG. 4 illustrates an example of a process flow that supports transport block size determination for sidelink slot aggregation in accordance with one or more aspects of the present disclosure.

FIG. 4 illustrates an example of a process flow 400 that supports transport block size determination for sidelink slot aggregation in accordance with one or more aspects of the present disclosure. The process flow 400 may include a first UE 115-c and a second UE 115-d, which may be examples of a UE 115 as described herein. In the following description of the process flow 400, the operations between the first UE 115-c and the second UE 115-d may be transmitted in a different order than the example order shown, or the operations performed by the first UE 115-c and the second UE 115-d may be performed in different orders or at different times. Some operations may also be omitted from the process flow 400, and other operations may be added to the process flow 400.

At 405, the first UE 115-c may transmit, to the second UE 115-d, a slot aggregated packet.

At 410, the first UE 115-c may receive, from the second UE 115-d, feedback indicating unsuccessful reception of a transport block of the slot aggregated packet. For example, the first UE 115-c may receive a NACK from the second UE 115-d indicating unsuccessful reception of a transport block of the slot aggregated packet.

At 415, the first UE 115-c may transmit, to the second UE 115-d and based on the feedback at 410, an SCI message indicating a transport block format for a retransmission of the transport block. The retransmission includes one transport block and occupies a single slot.

In some cases, the SCI message may include a bit (e.g., a single bit or a plurality of bits) that indicates may indicate whether an initial transport block format of the slot aggregated packet, as initially transmitted, includes one or more control channels, and a transport block size of the transport block in the retransmission may be based on the bit or bits indicating whether the initial transport block format includes the one or more control channels. In some examples, the bit or bits may indicate an absence of one or more control channels in the initial transport block format of the slot aggregated packet, and a transport block size of the transport block in the retransmission may be based on the absence of the one or more control channels. In some cases, bit or bits may indicate a size of one or more control channels of the initial transport block format of the slot aggregated packet, and a transport block size of the transport block in the retransmission may be based on the size of one or more control channels of the initial transport block format of the slot aggregated packet.

For example, a bit may indicate whether the initial transport block format of the slot aggregated packet contained a first control channel (CCH1) and a second control channel (CCH2). For example, CCH1 may correspond to PSCCH and PSCCH DMRS and CCH2 may correspond to a second stage SCI transmission. If the bit indicates the initial transport block format did not include CCH1 and CCH2, the second UE 115-d may determine the total number of resource elements for PSSCH using the equation $N_{RE}=N_{RE}' \cdot n_{PRB}$, without deducting the total number of resource elements occupied by the PSCCH and PSCCH DM-RS, or the number of coded modulation symbols generated for second stage SCI transmission. If the bit indicates that the initial transport block format included CCH1 and CCH2, the second UE 115-d may determine the total number of resource elements for PSSCH using the equation $N_{RE}=N_{RE}' \cdot n_{PRB}$ and may deduct the total number of resource elements occupied by the PSCCH and PSCCH DM-RS and the number of coded modulation symbols generated for second stage SCI transmission. In some cases, the CCH2 lengths in the slot aggregated packet and the retransmitted transport block may be different, and the difference may be compensated for in the computation of the transport block size of the retransmitted transport block.

In some cases, a bit or a quantity of bits may indicate whether an initial transport block format of the slot aggregated packet includes an AGC symbol and a different bit or quantity of bits may indicate whether an initial transport block format of the slot aggregated packet includes a gap symbol, and a transport block size of the transport block in the retransmission may be based on whether the initial transport block format of the slot aggregated packet includes the AGC symbol or the gap symbol. For example, if both the AGC symbol and the gap symbol are not included in the initial transport block format, then the second UE 115-d may determine a number of symbols ($N_{symb}^{sh}$) in the retransmitted transport block is equal to the parameter sl-LengthSymbols configured in control signaling (e.g., RRC signaling). If one of the AGC symbol or the gap symbol is not included in the initial transport block format, then the second UE 115-d may determine $N_{symb}^{sh}$=sl-LengthSymbols−1. If neither the AGC symbol nor the gap symbol are removed (e.g., both the AGC symbol and the gap symbol are included in the initial transport block format), then the second UE 115-d may determine $N_{symb}^{sh}$=sl-LengthSymbols−2. For example, based on whether the SCI message indicates that a gap symbol or AGC symbol were present in the initial transport block, the second UE 115-d may determine the size of the retransmitted transport block (e.g., based on determining a number of data symbols that will be retransmitted).

In some cases, a bit or bits may indicate whether an initial transport block format of the slot aggregated packet includes a sidelink feedback channel, and a transport block size of the transport block in the retransmission may be based on whether the initial transport block format of the slot aggregated packet includes the sidelink feedback channel. For example, the one bit may indicate whether a PSFCH was disabled. If PSFCH is disabled, the second UE 115-d may determine that a number of PSFCH symbols ($N_{symb}^{PSFCH}$) is equal to 0. If PSFCH is enabled, the second UE 115-d may determine that $N_{symb}^{PSFCH}$ IS equal to 3. For example, based on whether the SCI message indicates that a PSFCH symbols were present in the initial transport block, the second UE 115-d may determine the size of the retransmitted transport block (e.g., based on determining a number of data symbols that will be retransmitted).

In some cases, a bit or bits may indicate a number of DMRSs in the initial transport block format, and a transport block size of the transport block in the retransmission may be based on the number of DMRSs in the initial transport block format of the slot aggregated packet. For example, the second UE 115-d may update the number of resource elements for DMRS ($N_{RE}^{DMRS}$) using the indicated number instead of higher layer parameter sl-PSSCH-DMRS-TimePattern.

In some cases, a bit or bits in the SCI may be used for the purpose of transport block size determination. For example, for CCH1 and CCH2, if the bit indicates that CCH1 and CCH2 are not included, CCH1 and CCH2 may be transmitted by not included in the transport block size determination.

In some cases, a single bit may indicate a configuration for the transport block format, the configuration indicating two or more of: whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel. In some cases, the configuration may be RRC configured. In some cases, the configuration may be preconfigured. For example, two configurations including whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel. In some cases, the configuration may be RRC configured may be preconfigured, and the single bit may indicate which configuration corresponds to the transport block format.

In some cases, the first UE 115-c may transmit, with the SCI message, an indication of a second modulation and coding scheme (MCS) order associated with the retransmission of the transport block, where a first MCS order is associated with the slot aggregated packet. For example, the retransmitted transport block may be sent using a higher spectral efficiency so that an existing packet format may be used to pack the retransmitted packet. The retransmitted packet, due to the improvement by slot aggregation, may have a larger transport block size (e.g., if the existing format with control overhead, gap symbols, etc. leads to a transport block size of 4400 bytes, after removing the control overhead, the transport block size may be 5500 bytes). The MCS order may be indicated in a field in a header of the SCI message.

At 420, the first UE 115-c may transmit, to the second UE 115-d, the retransmission of the transport block in accordance with the transport block format.

In some cases, the first UE 115-c may determine values to indicate in the SCI message (e.g., whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel) if given the original slot aggregated packet that was transmitted and which transport block will be retransmitted in the slot aggregated packet. For example, the first UE 115-c may determine which transport block will be retransmitted based on an indication that the slot aggregated packet should be buffered or by decoding the ACK/NACK feedback received from the second UE 115-d.

The second UE 115-d may receive the values in the SCI message (e.g., that indicate whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel) and calculate a transport block size of the retransmission of the transport block based on the values indicated in the SCI message and which transport block is being transmitted. The second UE 115-d may properly receive and decode the retransmitted transport block based on the determined transport block size.

In some scenarios, a slot aggregated packet may include one code block group per slot (e.g., as compared to one transport block per slot as described herein). The same process described herein for retransmission of a transport block of a slot aggregated packets may be applied to retransmission of a code block group of a slot aggregated packet.

Figure 5:
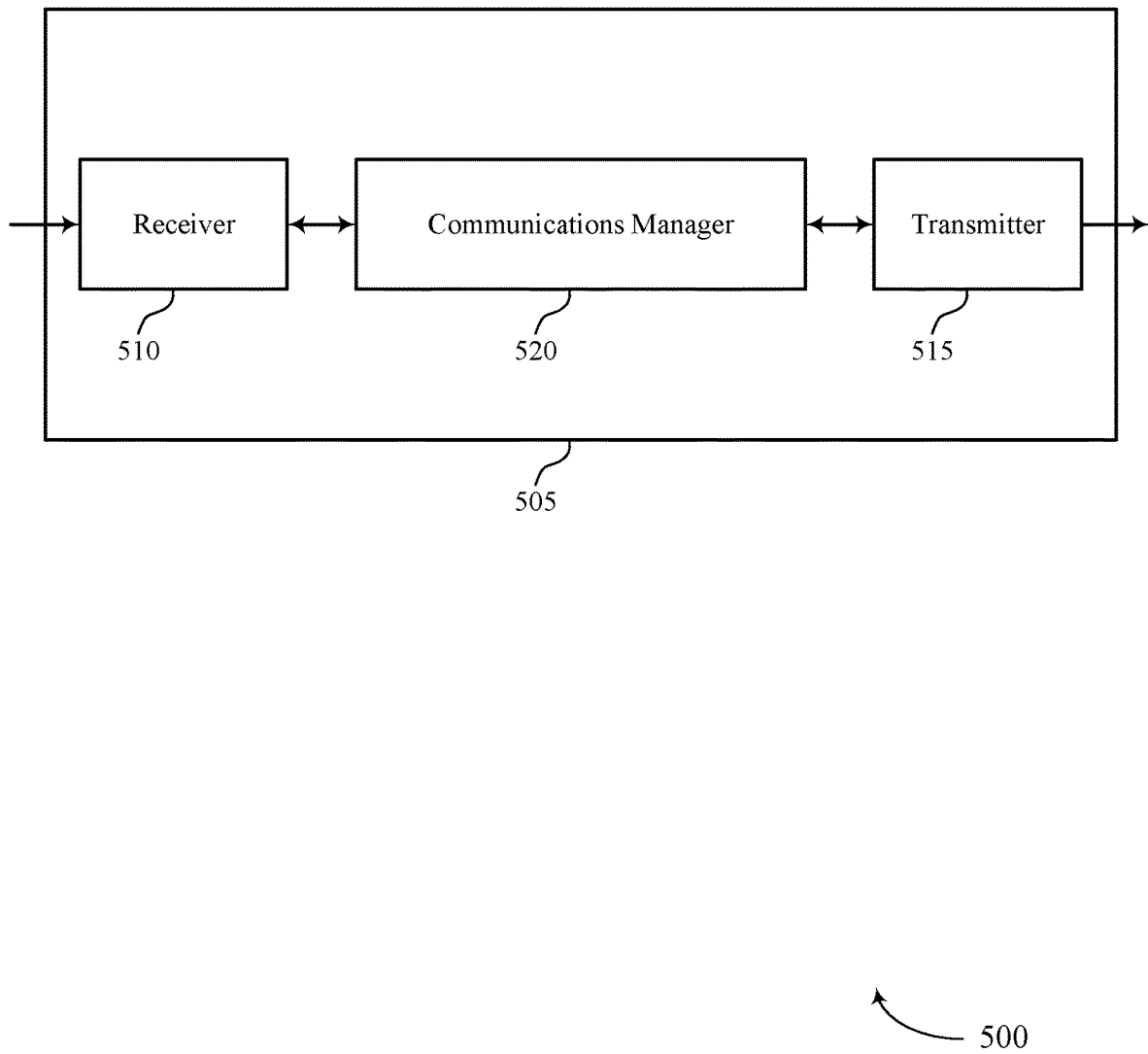
FIGS. 5 and 6 show block diagrams of devices that support transport block size determination for sidelink slot aggregation in accordance with one or more aspects of the present disclosure.

FIG. 5 shows a block diagram 500 of a device 505 that supports transport block size determination for sidelink slot aggregation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to transport block size determination for sidelink slot aggregation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to transport block size determination for sidelink slot aggregation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of transport block size determination for sidelink slot aggregation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first UE in accordance with examples as disclosed herein. For example, the communications manager 520 may be configured as or otherwise support a means for transmitting, to a second UE, a slot aggregated packet. The communications manager 520 may be configured as or otherwise support a means for receiving, from the second UE, feedback indicating unsuccessful reception of a transport block of the slot aggregated packet. The communications manager 520 may be configured as or otherwise support a means for transmitting, to the second UE and based on the feedback, an SCI message indicating a transport block format for a retransmission of the transport block. The communications manager 520 may be configured as or otherwise support a means for transmitting, to the second UE, the retransmission of the transport block in accordance with the transport block format.

Additionally, or alternatively, the communications manager 520 may support wireless communications at a second UE in accordance with examples as disclosed herein. For example, the communications manager 520 may be configured as or otherwise support a means for receiving, from a first UE, a slot aggregated packet. The communications manager 520 may be configured as or otherwise support a means for transmitting, to the first UE, feedback indicating unsuccessful reception of a transport block of the slot aggregated packet. The communications manager 520 may be configured as or otherwise support a means for receiving, from the first UE and at least in part in response to the feedback, an SCI message indicating a transport block format for a retransmission of the transport block. The communications manager 520 may be configured as or otherwise support a means for receiving, from the first UE, the retransmission of the transport block in accordance with the transport block format.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by indicating a transport block format of a retransmitted transport block for a slot aggregated packet.

Figure 6:
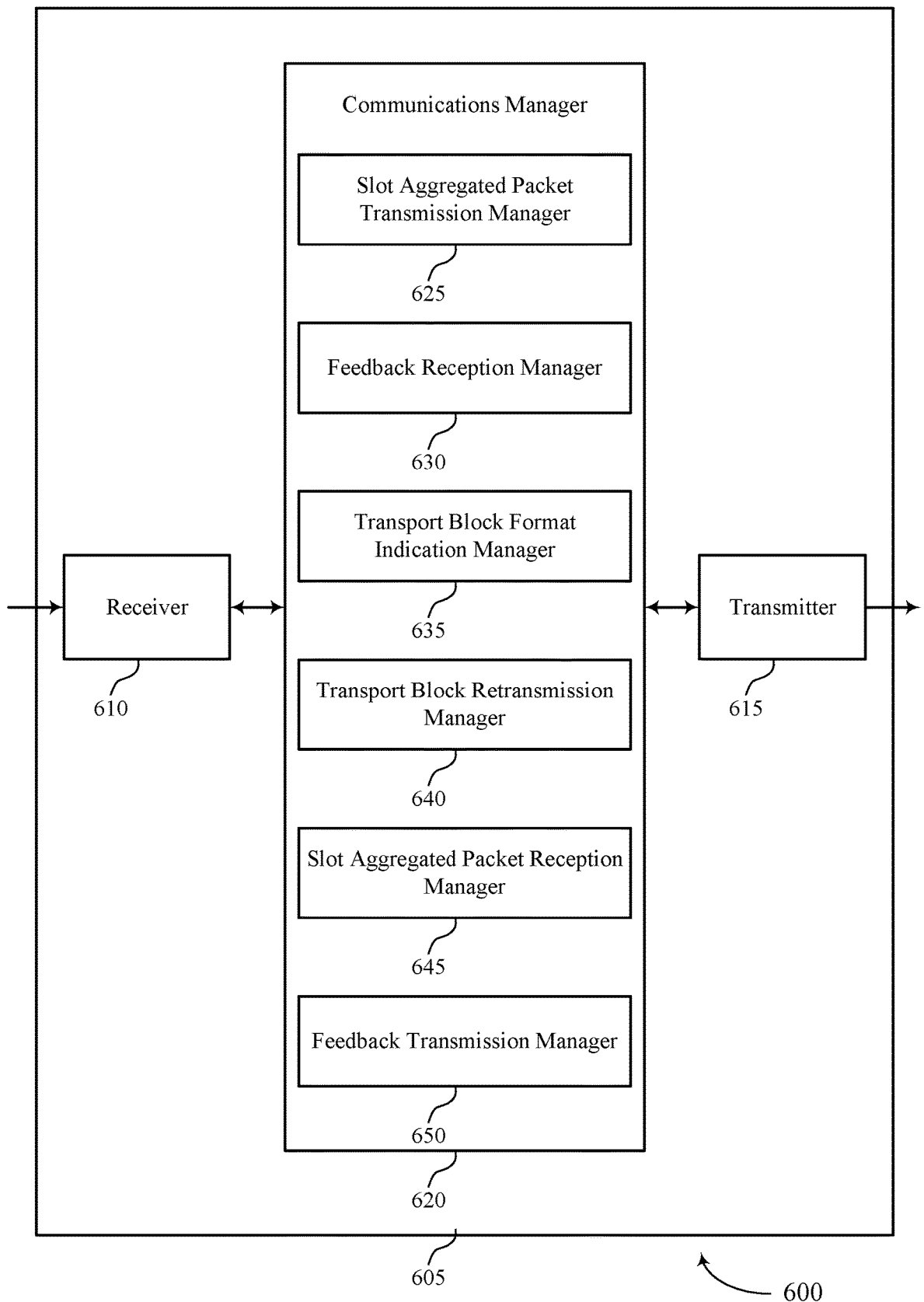

FIG. 6 shows a block diagram 600 of a device 605 that supports transport block size determination for sidelink slot aggregation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transport block size determination for sidelink slot aggregation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transport block size determination for sidelink slot aggregation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of transport block size determination for sidelink slot aggregation as described herein. For example, the communications manager 620 may include a slot aggregated packet transmission manager 625, a feedback reception manager 630, a transport block format indication manager 635, a transport block retransmission manager 640, a slot aggregated packet reception manager 645, a feedback transmission manager 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. The slot aggregated packet transmission manager 625 may be configured as or otherwise support a means for transmitting, to a second UE, a slot aggregated packet. The feedback reception manager 630 may be configured as or otherwise support a means for receiving, from the second UE, feedback indicating unsuccessful reception of a transport block of the slot aggregated packet. The transport block format indication manager 635 may be configured as or otherwise support a means for transmitting, to the second UE and based on the feedback, an SCI message indicating a transport block format for a retransmission of the transport block. The transport block retransmission manager 640 may be configured as or otherwise support a means for transmitting, to the second UE, the retransmission of the transport block in accordance with the transport block format.

Additionally, or alternatively, the communications manager 620 may support wireless communications at a second UE in accordance with examples as disclosed herein. The slot aggregated packet reception manager 645 may be configured as or otherwise support a means for receiving, from a first UE, a slot aggregated packet. The feedback transmission manager 650 may be configured as or otherwise support a means for transmitting, to the first UE, feedback indicating unsuccessful reception of a transport block of the slot aggregated packet. The transport block format indication manager 635 may be configured as or otherwise support a means for receiving, from the first UE and at least in part in response to the feedback, an SCI message indicating a transport block format for a retransmission of the transport block. The transport block retransmission manager 640 may be configured as or otherwise support a means for receiving, from the first UE, the retransmission of the transport block in accordance with the transport block format.

Figure 7:
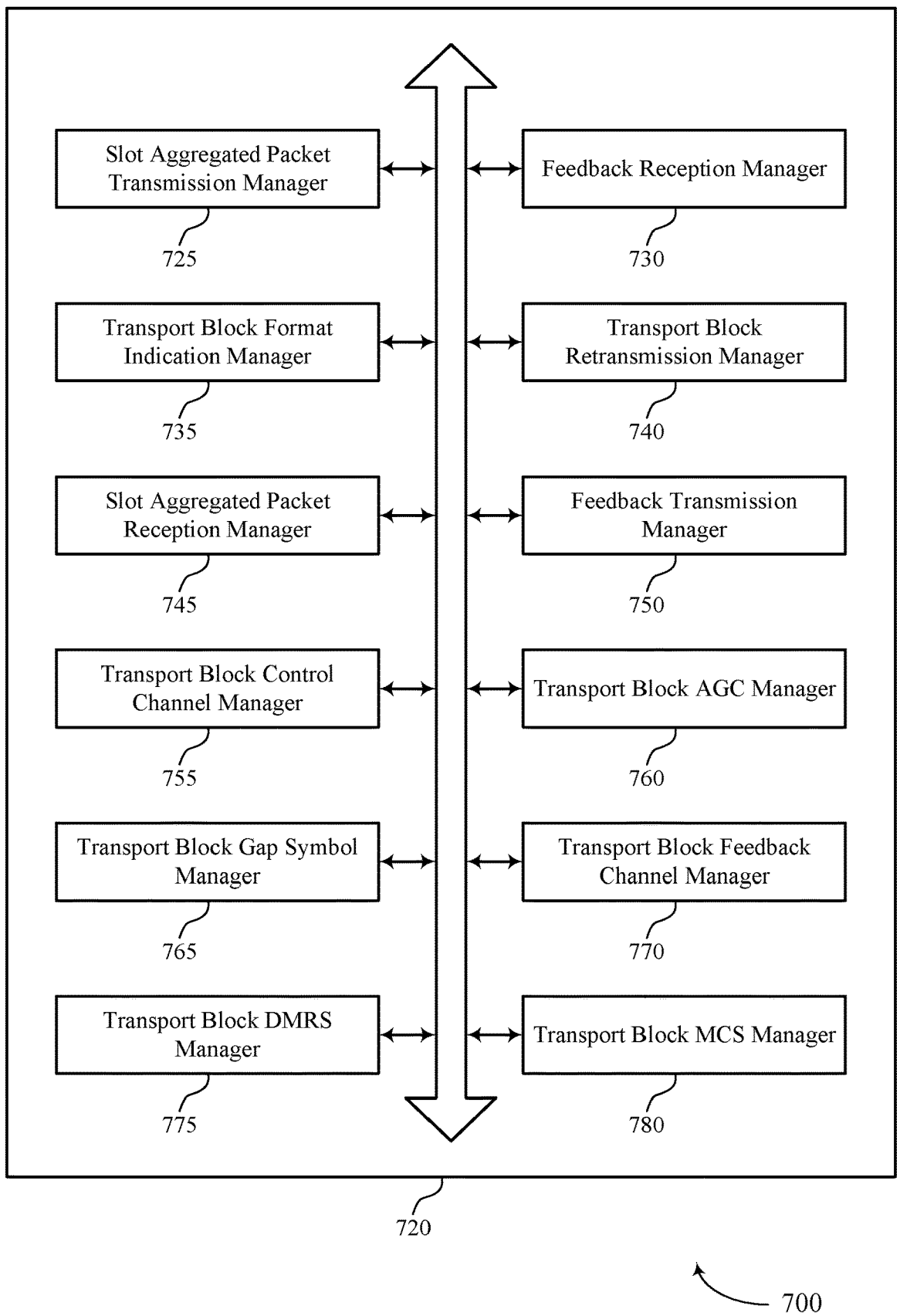
FIG. 7 shows a block diagram of a communications manager that supports transport block size determination for sidelink slot aggregation in accordance with one or more aspects of the present disclosure.

FIG. 7 shows a block diagram 700 of a communications manager 720 that supports transport block size determination for sidelink slot aggregation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of transport block size determination for sidelink slot aggregation as described herein. For example, the communications manager 720 may include a slot aggregated packet transmission manager 725, a feedback reception manager 730, a transport block format indication manager 735, a transport block retransmission manager 740, a slot aggregated packet reception manager 745, a feedback transmission manager 750, a transport block control channel manager 755, a transport block AGC manager 760, a transport block gap symbol manager 765, a transport block feedback channel manager 770, a transport block DMRS manager 775, a transport block MCS manager 780, or any combination thereof. Each of these components may communicate, directly or indirectly, with one another (e.g., via one or more buses).

The communications manager 720 may support wireless communications at a first UE in accordance with examples as disclosed herein. The slot aggregated packet transmission manager 725 may be configured as or otherwise support a means for transmitting, to a second UE, a slot aggregated packet. The feedback reception manager 730 may be configured as or otherwise support a means for receiving, from the second UE, feedback indicating unsuccessful reception of a transport block of the slot aggregated packet. The transport block format indication manager 735 may be configured as or otherwise support a means for transmitting, to the second UE and based on the feedback, an SCI message indicating a transport block format for a retransmission of the transport block. The transport block retransmission manager 740 may be configured as or otherwise support a means for transmitting, to the second UE, the retransmission of the transport block in accordance with the transport block format.

In some examples, to support transmitting the SCI message, the transport block control channel manager 755 may be configured as or otherwise support a means for transmitting the SCI message including a bit indicating whether an initial transport block format of the slot aggregated packet includes one or more control channels, where a transport block size of the transport block in the retransmission is based on the bit indicating whether the initial transport block format includes the one or more control channels.

In some examples, the one or more control channels include one or more of a sidelink control channel, a sidelink control channel DMRS, and a second stage SCI transmission.

In some examples, to support transmitting the SCI message, the transport block control channel manager 755 may be configured as or otherwise support a means for transmitting the SCI message including a bit indicating an absence of one or more control channels in an initial transport block format of the slot aggregated packet, and where a transport block size of the transport block in the retransmission is based on the absence of the one or more control channels.

In some examples, to support transmitting the SCI message, the transport block control channel manager 755 may be configured as or otherwise support a means for transmitting the SCI message including a bit indicating a size of one or more control channels of an initial transport block format of the slot aggregated packet, where a transport block size of the transport block in the retransmission is based on the size of one or more control channels of the initial transport block format of the slot aggregated packet.

In some examples, to support transmitting the SCI message, the transport block AGC manager 760 may be configured as or otherwise support a means for transmitting the SCI message including a bit indicating whether an initial transport block format of the slot aggregated packet includes an AGC symbol, where a transport block size of the transport block in the retransmission is based on whether the initial transport block format of the slot aggregated packet includes the AGC symbol.

In some examples, to support transmitting the SCI message, the transport block gap symbol manager 765 may be configured as or otherwise support a means for transmitting the SCI message including a bit indicating whether an initial transport block format of the slot aggregated packet includes a gap symbol, where a transport block size of the transport block in the retransmission is based on whether the initial transport block format of the slot aggregated packet includes the gap symbol.

In some examples, to support transmitting the SCI message, the transport block feedback channel manager 770 may be configured as or otherwise support a means for transmitting the SCI message including a bit indicating whether an initial transport block format of the slot aggregated packet includes a sidelink feedback channel, where a transport block size of the transport block in the retransmission is based on whether the initial transport block format of the slot aggregated packet includes the sidelink feedback channel.

In some examples, to support transmitting the SCI message, the transport block DMRS manager 775 may be configured as or otherwise support a means for transmitting the SCI message including a bit indicating a number of DMRSs in an initial transport block format of the slot aggregated packet.

In some examples, to support transmitting the SCI message, the transport block format indication manager 735 may be configured as or otherwise support a means for transmitting the SCI message including one bit indicating a configuration for the transport block format, the configuration indicating two or more of whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel.

In some examples, the transport block format indication manager 735 may be configured as or otherwise support a means for transmitting, to the second UE, control signaling indicating one or more configurations, where the one or more configurations include the configuration.

In some examples, to support transmitting the SCI message, the transport block MCS manager 780 may be configured as or otherwise support a means for transmitting the SCI message including an indication of a second modulation and coding scheme order associated with the retransmission of the transport block, where a first modulation and coding scheme order is associated with the slot aggregated packet.

Additionally, or alternatively, the communications manager 720 may support wireless communications at a second UE in accordance with examples as disclosed herein. The slot aggregated packet reception manager 745 may be configured as or otherwise support a means for receiving, from a first UE, a slot aggregated packet. The feedback transmission manager 750 may be configured as or otherwise support a means for transmitting, to the first UE, feedback indicating unsuccessful reception of a transport block of the slot aggregated packet. In some examples, the transport block format indication manager 735 may be configured as or otherwise support a means for receiving, from the first UE and at least in part in response to the feedback, an SCI message indicating a transport block format for a retransmission of the transport block. In some examples, the transport block retransmission manager 740 may be configured as or otherwise support a means for receiving, from the first UE, the retransmission of the transport block in accordance with the transport block format.

In some examples, to support receiving the SCI message, the transport block control channel manager 755 may be configured as or otherwise support a means for receiving the SCI message including a bit indicating whether an initial transport block format of the slot aggregated packet includes one or more control channels, where a transport block size of the transport block in the retransmission is calculated in accordance with the bit indicating whether the initial transport block format of the slot aggregated packet includes one or more control channels.

In some examples, the one or more control channels include one or more of a sidelink control channel, a sidelink control channel DMRS, and a second stage SCI transmission.

In some examples, to support receiving the SCI message, the transport block control channel manager 755 may be configured as or otherwise support a means for receiving the SCI message including a bit indicating an absence of the one or more control channels in an initial transport block format of the slot aggregated packet, and where a number of sidelink shared channel resources in the transport block format used to calculate a transport block size of the transport block in the retransmission is based on the absence of the one or more control channels.

In some examples, to support receiving the SCI message, the transport block control channel manager 755 may be configured as or otherwise support a means for receiving the SCI message including a bit indicating a size of one or more control channels of an initial transport block format of the slot aggregated packet, where a transport block size of the transport block in the retransmission is calculated based on the size of one or more control channels of the initial transport block format of the slot aggregated packet.

In some examples, to support receiving the SCI message, the transport block AGC manager 760 may be configured as or otherwise support a means for receiving the SCI message including a bit indicating whether an initial transport block format of the slot aggregated packet includes an AGC symbol, where a transport block size of the transport block in the retransmission is calculated based on whether the initial transport block format of the slot aggregated packet includes the AGC symbol.

In some examples, to support receiving the SCI message, the transport block gap symbol manager 765 may be configured as or otherwise support a means for receiving the SCI message including a bit indicating whether an initial transport block format of the slot aggregated packet includes a gap symbol, where a transport block size of the transport block in the retransmission is calculated based on whether the initial transport block format of the slot aggregated packet includes the gap symbol.

In some examples, to support receiving the SCI message, the transport block feedback channel manager 770 may be configured as or otherwise support a means for receiving the SCI message including a bit indicating whether an initial transport block format of the slot aggregated packet includes a sidelink feedback channel, where a transport block size of the transport block in the retransmission is calculated based on whether the initial transport block format of the slot aggregated packet includes the sidelink feedback channel.

In some examples, to support receiving the SCI message, the transport block DMRS manager 775 may be configured as or otherwise support a means for receiving the SCI message including a bit indicating a number of DMRSs in an initial transport block format of the slot aggregated packet.

In some examples, to support receiving the SCI message, the transport block format indication manager 735 may be configured as or otherwise support a means for receiving the SCI message including one bit indicating a configuration for the transport block format, the configuration indicating two or more of: whether an initial transport block format of the slot aggregated packet includes one or more control channels, whether the initial transport block format of the slot aggregated packet includes an AGC symbol, whether the initial transport block format of the slot aggregated packet includes a gap symbol, and whether the initial transport block format of the slot aggregated packet includes a sidelink feedback channel.

In some examples, the transport block format indication manager 735 may be configured as or otherwise support a means for receiving, from the first UE, control signaling indicating one or more configurations, where the one or more configurations include the configuration.

In some examples, to support receiving the SCI message, the transport block MCS manager 780 may be configured as or otherwise support a means for receiving the SCI message including an indication of a second modulation and coding scheme order associated with the retransmission of the transport block, where a first modulation and coding scheme order is associated with the slot aggregated packet.

Figure 8:
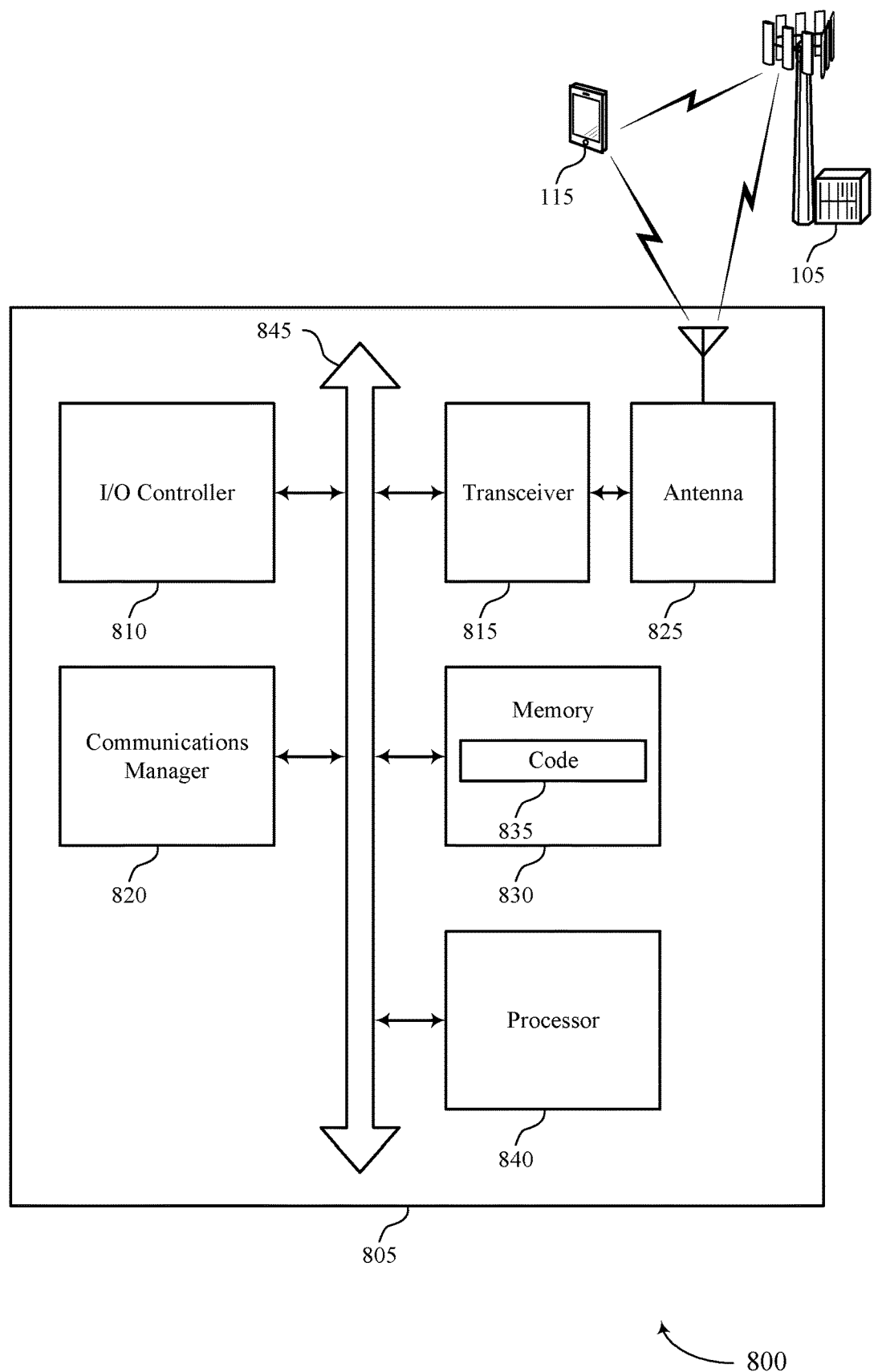
FIG. 8 shows a diagram of a system including a device that supports transport block size determination for sidelink slot aggregation in accordance with one or more aspects of the present disclosure.

FIG. 8 shows a diagram of a system 800 including a device 805 that supports transport block size determination for sidelink slot aggregation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting transport block size determination for sidelink slot aggregation). For example, the device 805 or a component of the device 805 may include a processor 840 and memory 830 coupled with or to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for transmitting, to a second UE, a slot aggregated packet. The communications manager 820 may be configured as or otherwise support a means for receiving, from the second UE, feedback indicating unsuccessful reception of a transport block of the slot aggregated packet. The communications manager 820 may be configured as or otherwise support a means for transmitting, to the second UE and based on the feedback, an SCI message indicating a transport block format for a retransmission of the transport block. The communications manager 820 may be configured as or otherwise support a means for transmitting, to the second UE, the retransmission of the transport block in accordance with the transport block format.

Additionally, or alternatively, the communications manager 820 may support wireless communications at a second UE in accordance with examples as disclosed herein. For example, the communications manager 820 may be configured as or otherwise support a means for receiving, from a first UE, a slot aggregated packet. The communications manager 820 may be configured as or otherwise support a means for transmitting, to the first UE, feedback indicating unsuccessful reception of a transport block of the slot aggregated packet. The communications manager 820 may be configured as or otherwise support a means for receiving, from the first UE and at least in part in response to the feedback, an SCI message indicating a transport block format for a retransmission of the transport block. The communications manager 820 may be configured as or otherwise support a means for receiving, from the first UE, the retransmission of the transport block in accordance with the transport block format.

By including or configuring the communications manager 820 in accordance with examples as described herein, the device 805 may support techniques for improved communication reliability, more efficient utilization of communication resources, and improved coordination between devices by indicating a transport block format of a retransmitted transport block for a slot aggregated packet.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of transport block size determination for sidelink slot aggregation as described herein, or the processor 840 and the memory 830 may be otherwise configured to perform or support such operations.

Figure 9:
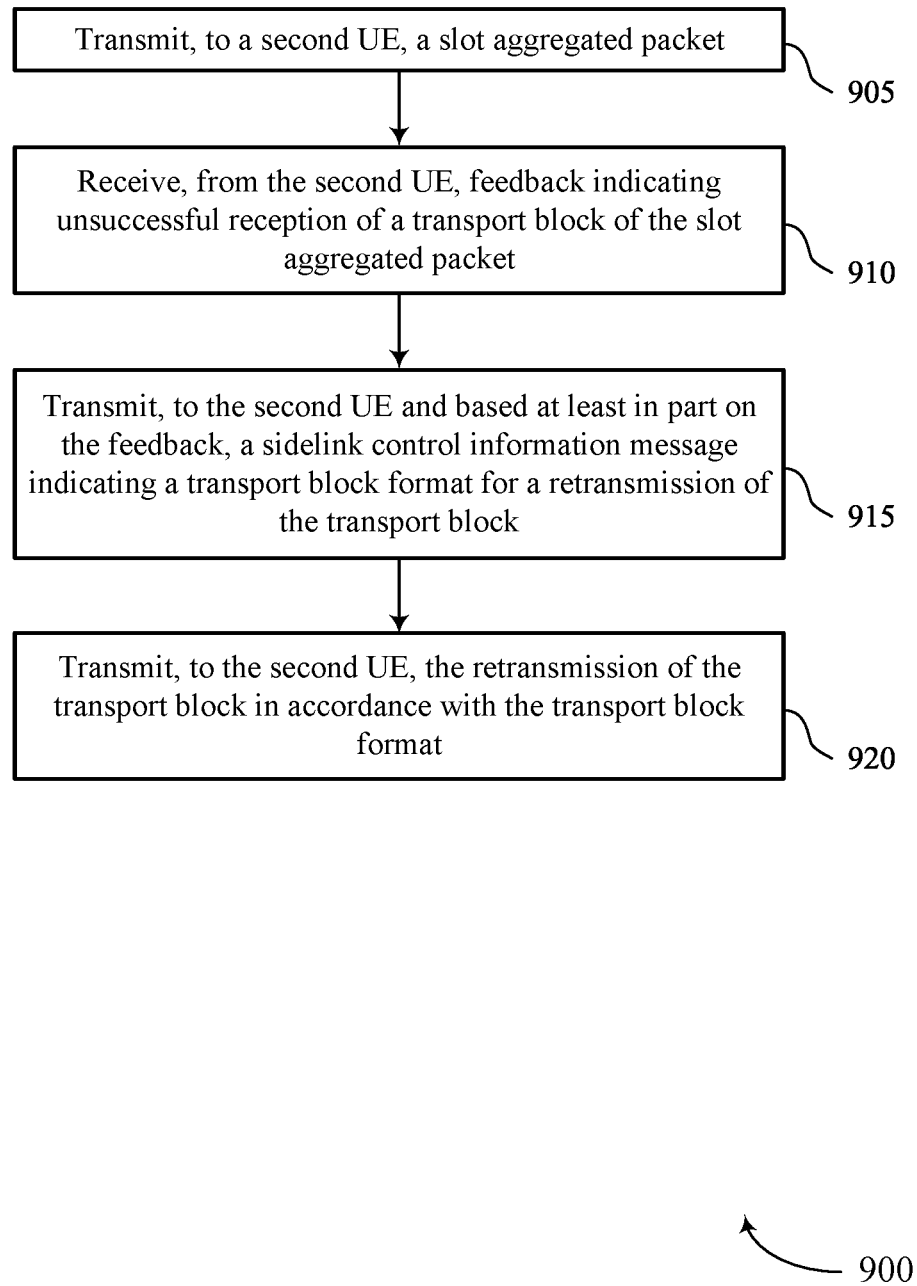
FIGS. 9 through 10 show flowcharts illustrating methods that support transport block size determination for sidelink slot aggregation in accordance with one or more aspects of the present disclosure.

FIG. 9 shows a flowchart illustrating a method 900 that supports transport block size determination for sidelink slot aggregation in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting, to a second UE, a slot aggregated packet. The operations of 905 may be performed in accordance with examples as disclosed herein.

In some examples, aspects of the operations of 905 may be performed by a slot aggregated packet transmission manager 725 as described with reference to FIG. 7.

At 910, the method may include receiving, from the second UE, feedback indicating unsuccessful reception of a transport block of the slot aggregated packet. The operations of 910 may be performed in accordance with examples as disclosed herein. In some examples, aspects of the operations of 910 may be performed by a feedback reception manager 730 as described with reference to FIG. 7.

At 915, the method may include transmitting, to the second UE and based on the feedback, an SCI message indicating a transport block format for a retransmission of the transport block. The operations of 915 may be performed in accordance with examples as disclosed herein. In some examples, aspects of the operations of 915 may be performed by a transport block format indication manager 735 as described with reference to FIG. 7.

At 920, the method may include transmitting, to the second UE, the retransmission of the transport block in accordance with the transport block format. The operations of 920 may be performed in accordance with examples as disclosed herein. In some examples, aspects of the operations of 920 may be performed by a transport block retransmission manager 740 as described with reference to FIG. 7.

Figure 10:
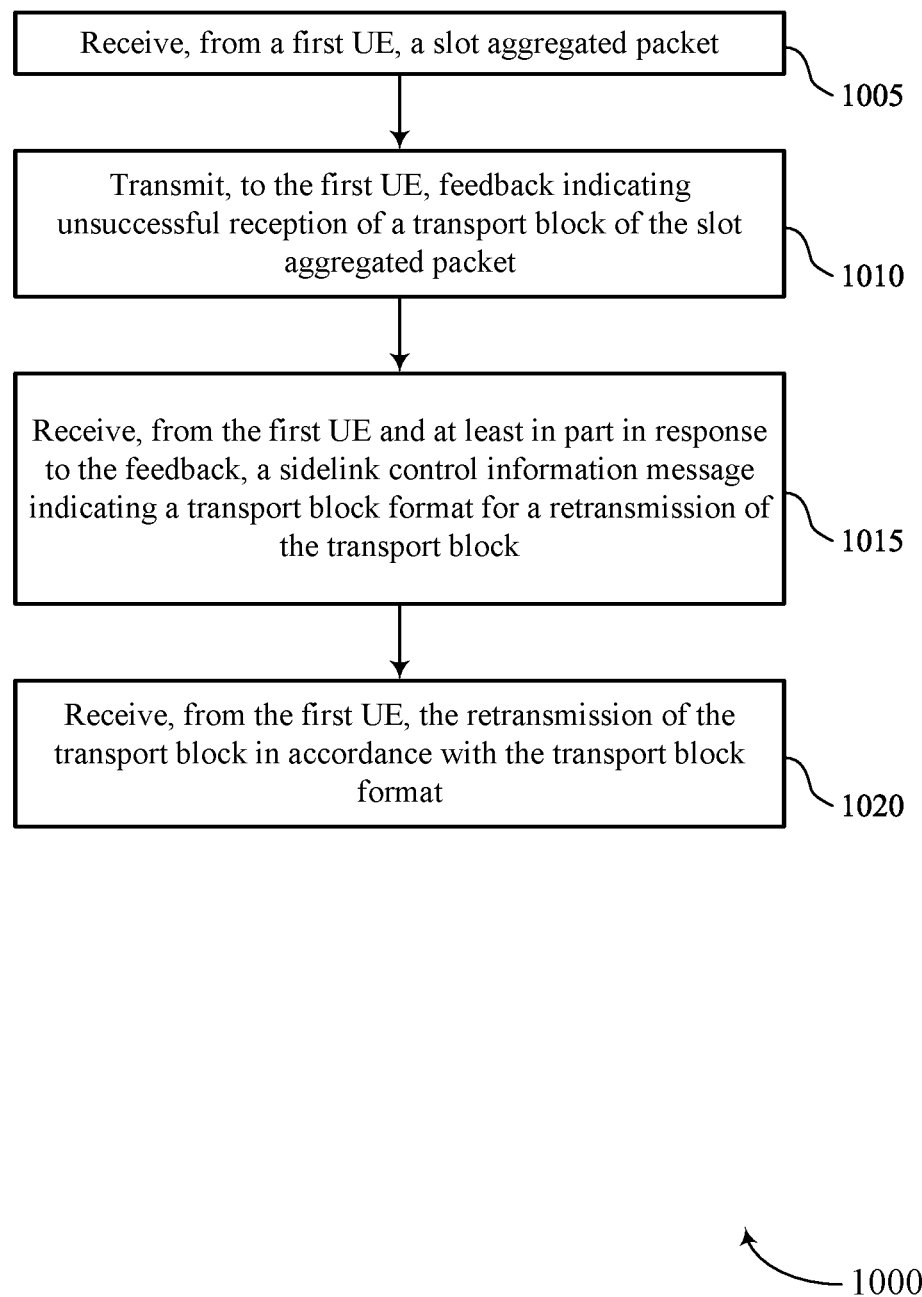

FIG. 10 shows a flowchart illustrating a method 1000 that supports transport block size determination for sidelink slot aggregation in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving, from a first UE, a slot aggregated packet. The operations of 1005 may be performed in accordance with examples as disclosed herein. In some examples, aspects of the operations of 1005 may be performed by a slot aggregated packet reception manager 745 as described with reference to FIG. 7.

At 1010, the method may include transmitting, to the first UE, feedback indicating unsuccessful reception of a transport block of the slot aggregated packet. The operations of 1010 may be performed in accordance with examples as disclosed herein. In some examples, aspects of the operations of 1010 may be performed by a feedback transmission manager 750 as described with reference to FIG. 7.

At 1015, the method may include receiving, from the first UE and at least in part in response to the feedback, an SCI message indicating a transport block format for a retransmission of the transport block. The operations of 1015 may be performed in accordance with examples as disclosed herein. In some examples, aspects of the operations of 1015 may be performed by a transport block format indication manager 735 as described with reference to FIG. 7.

At 1020, the method may include receiving, from the first UE, the retransmission of the transport block in accordance with the transport block format. The operations of 1020 may be performed in accordance with examples as disclosed herein. In some examples, aspects of the operations of 1020 may be performed by a transport block retransmission manager 740 as described with reference to FIG. 7.

The following provides an overview of aspects of the present disclosure:

Aspect 1: A method for wireless communications at a first UE, comprising: transmitting, to a second UE, a slot aggregated packet; receiving, from the second UE, feedback indicating unsuccessful reception of a transport block of the slot aggregated packet; transmitting, to the second UE and based at least in part on the feedback, an SCI message indicating a transport block format for a retransmission of the transport block; and transmitting, to the second UE, the retransmission of the transport block in accordance with the transport block format.

Aspect 2: The method of aspect 1, wherein transmitting the SCI message comprises: transmitting the SCI message comprising a bit indicating whether an initial transport block format of the slot aggregated packet includes one or more control channels, wherein a transport block size of the transport block in the retransmission is based at least in part on the bit indicating whether the initial transport block format includes the one or more control channels.

Aspect 3: The method of aspect 2, wherein the one or more control channels comprise one or more of a sidelink control channel, a sidelink control channel demodulation reference signal, and a second stage SCI transmission.

Aspect 4: The method of any of aspects 1 through 3, wherein transmitting the SCI message comprises: transmitting the SCI message comprising a bit indicating an absence of one or more control channels in an initial transport block format of the slot aggregated packet, and wherein a transport block size of the transport block in the retransmission is based at least in part on the absence of the one or more control channels.

Aspect 5: The method of any of aspects 1 through 4, wherein transmitting the SCI message comprises: transmitting the SCI message comprising a bit indicating a size of one or more control channels of an initial transport block format of the slot aggregated packet, wherein a transport block size of the transport block in the retransmission is based at least in part on the size of one or more control channels of the initial transport block format of the slot aggregated packet.

Aspect 6: The method of any of aspects 1 through 5, wherein transmitting the SCI message comprises: transmitting the SCI message comprising a bit indicating whether an initial transport block format of the slot aggregated packet includes an automatic gain control symbol, wherein a transport block size of the transport block in the retransmission is based at least in part on whether the initial transport block format of the slot aggregated packet includes the automatic gain control symbol.

Aspect 7: The method of any of aspects 1 through 6, wherein transmitting the SCI message comprises: transmitting the SCI message comprising a bit indicating whether an initial transport block format of the slot aggregated packet includes a gap symbol, wherein a transport block size of the transport block in the retransmission is based at least in part on whether the initial transport block format of the slot aggregated packet includes the gap symbol.

Aspect 8: The method of any of aspects 1 through 7, wherein transmitting the SCI message comprises: transmitting the SCI message comprising a bit indicating whether an initial transport block format of the slot aggregated packet includes a sidelink feedback channel, wherein a transport block size of the transport block in the retransmission is based at least in part on whether the initial transport block format of the slot aggregated packet includes the sidelink feedback channel.

Aspect 9: The method of any of aspects 1 through 8, wherein transmitting the SCI message comprises: transmitting the SCI message comprising a bit indicating a number of demodulation reference signals in an initial transport block format of the slot aggregated packet.

Aspect 10: The method of any of aspects 1 through 9, wherein transmitting the SCI message comprises: transmitting the SCI message comprising one bit indicating a configuration for the transport block format, the configuration indicating two or more of: whether an initial transport block format of the slot aggregated packet includes one or more control channels, whether the initial transport block format of the slot aggregated packet includes an automatic gain control symbol, whether the initial transport block format of the slot aggregated packet includes a gap symbol, and whether the initial transport block format of the slot aggregated packet includes a sidelink feedback channel.

Aspect 11: The method of aspect 10, further comprising: transmitting, to the second UE, control signaling indicating one or more configurations, wherein the one or more configurations comprise the configuration.

Aspect 12: The method of any of aspects 1 through 11, wherein transmitting the SCI message comprises: transmitting the SCI message comprising an indication of a second modulation and coding scheme order associated with the retransmission of the transport block, wherein a first modulation and coding scheme order is associated with the slot aggregated packet.

Aspect 13: A method for wireless communications at a second UE, comprising: receiving, from a first UE, a slot aggregated packet; transmitting, to the first UE, feedback indicating unsuccessful reception of a transport block of the slot aggregated packet; receiving, from the first UE and at least in part in response to the feedback, an SCI message indicating a transport block format for a retransmission of the transport block; and receiving, from the first UE, the retransmission of the transport block in accordance with the transport block format.

Aspect 14: The method of aspect 13, wherein receiving the SCI message comprises: receiving the SCI message comprising a bit indicating whether an initial transport block format of the slot aggregated packet includes one or more control channels, wherein a transport block size of the transport block in the retransmission is calculated in accordance with the bit indicating whether the initial transport block format of the slot aggregated packet includes one or more control channels.

Aspect 15: The method of aspect 14, wherein the one or more control channels comprise one or more of a sidelink control channel, a sidelink control channel demodulation reference signal, and a second stage SCI transmission.

Aspect 16: The method of any of aspects 13 through 15, wherein receiving the SCI message comprises: receiving the SCI message comprising a bit indicating an absence of the one or more control channels in an initial transport block format of the slot aggregated packet, and wherein a number of sidelink shared channel resources in the transport block format used to calculate a transport block size of the transport block in the retransmission is based at least in part on the absence of the one or more control channels.

Aspect 17: The method of any of aspects 13 through 16, wherein receiving the SCI message comprises: receiving the SCI message comprising a bit indicating a size of one or more control channels of an initial transport block format of the slot aggregated packet, wherein a transport block size of the transport block in the retransmission is calculated based at least in part on the size of one or more control channels of the initial transport block format of the slot aggregated packet.

Aspect 18: The method of any of aspects 13 through 17, wherein receiving the SCI message comprises: receiving the SCI message comprising a bit indicating whether an initial transport block format of the slot aggregated packet includes an automatic gain control symbol, wherein a transport block size of the transport block in the retransmission is calculated based at least in part on whether the initial transport block format of the slot aggregated packet includes the automatic gain control symbol.

Aspect 19: The method of any of aspects 13 through 18, wherein receiving the SCI message comprises: receiving the SCI message comprising a bit indicating whether an initial transport block format of the slot aggregated packet includes a gap symbol, wherein a transport block size of the transport block in the retransmission is calculated based at least in part on whether the initial transport block format of the slot aggregated packet includes the gap symbol.

Aspect 20: The method of any of aspects 13 through 19, wherein receiving the SCI message comprises: receiving the SCI message comprising a bit indicating whether an initial transport block format of the slot aggregated packet includes a sidelink feedback channel, wherein a transport block size of the transport block in the retransmission is calculated based at least in part on whether the initial transport block format of the slot aggregated packet includes the sidelink feedback channel.

Aspect 21: The method of any of aspects 13 through 20, wherein receiving the SCI message comprises: receiving the SCI message comprising a bit indicating a number of demodulation reference signals in an initial transport block format of the slot aggregated packet.

Aspect 22: The method of any of aspects 13 through 21, wherein receiving the SCI message comprises: receiving the SCI message comprising one bit indicating a configuration for the transport block format, the configuration indicating two or more of: whether an initial transport block format of the slot aggregated packet includes one or more control channels, whether the initial transport block format of the slot aggregated packet includes an automatic gain control symbol, whether the initial transport block format of the slot aggregated packet includes a gap symbol, and whether the initial transport block format of the slot aggregated packet includes a sidelink feedback channel.

Aspect 23: The method of aspect 22, further comprising: receiving, from the first UE, control signaling indicating one or more configurations, wherein the one or more configurations comprise the configuration.

Aspect 24: The method of any of aspects 13 through 23, wherein receiving the SCI message comprises: receiving the SCI message comprising an indication of a second modulation and coding scheme order associated with the retransmission of the transport block, wherein a first modulation and coding scheme order is associated with the slot aggregated packet.

Aspect 25: An apparatus for wireless communications at a first UE, comprising a processor; memory coupled with the processor; and instructions stored in the memory and executable by the processor to cause the apparatus to perform a method of any of aspects 1 through 12.

Aspect 26: An apparatus for wireless communications at a first UE, comprising at least one means for performing a method of any of aspects 1 through 12.

Aspect 27: A non-transitory computer-readable medium storing code for wireless communications at a first UE, the code comprising instructions executable by a processor to perform a method of any of aspects 1 through 12.

Aspect 28: An apparatus for wireless communications at a second UE, comprising a processor; memory coupled with the processor; and instructions stored in the memory and executable by the processor to cause the apparatus to perform a method of any of aspects 13 through 24.

Aspect 29: An apparatus for wireless communications at a second UE, comprising at least one means for performing a method of any of aspects 13 through 24.

Aspect 30: A non-transitory computer-readable medium storing code for wireless communications at a second UE, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   one or more memories coupled with the one or more processors; and
   instructions stored in the one or more memories and executable by the one or more processors to cause the apparatus to:
   transmit, to a second UE, a slot aggregated packet;
   receive, from the second UE, feedback indicating unsuccessful reception of a transport block of the slot aggregated packet;
   transmit, to the second UE and based at least in part on the feedback, a sidelink control information message indicating a first transport block format for a retransmission of the transport block; and
   transmit, to the second UE, the retransmission of the transport block in accordance with the first transport block format, wherein the first transport block format of the retransmission of the transport block is different than a second transport block format of the slot aggregated packet.

2. The apparatus of claim 1, wherein the instructions to transmit the sidelink control information message are executable by the one or more processors to cause the apparatus to:
   transmit the sidelink control information message comprising a bit indicating whether the second transport block format of the slot aggregated packet includes one or more control channels, wherein a transport block size of the transport block in the retransmission is based at least in part on the bit indicating whether the second transport block format includes the one or more control channels.

3. The apparatus of claim 2, wherein the one or more control channels comprise one or more of a sidelink control channel, a sidelink control channel demodulation reference signal, and a second stage sidelink control information transmission.

4. The apparatus of claim 1, wherein the instructions to transmit the sidelink control information message are executable by the one or more processors to cause the apparatus to:
   transmit the sidelink control information message comprising a bit indicating an absence of one or more control channels in the second transport block format of the slot aggregated packet, and wherein a transport block size of the transport block in the retransmission is based at least in part on the absence of the one or more control channels.

5. The apparatus of claim 1, wherein the instructions to transmit the sidelink control information message are executable by the one or more processors to cause the apparatus to:
   transmit the sidelink control information message comprising a bit indicating a size of one or more control channels of the second transport block format of the slot aggregated packet, wherein a transport block size of the transport block in the retransmission is based at least in part on the size of one or more control channels of the second transport block format of the slot aggregated packet.

6. The apparatus of claim 1, wherein the instructions to transmit the sidelink control information message are executable by the one or more processors to cause the apparatus to:
   transmit the sidelink control information message comprising a bit indicating whether the second transport block format of the slot aggregated packet includes an automatic gain control symbol, wherein a transport block size of the transport block in the retransmission is based at least in part on whether the second transport block format of the slot aggregated packet includes the automatic gain control symbol.

7. The apparatus of claim 1, wherein the instructions to transmit the sidelink control information message are executable by the one or more processors to cause the apparatus to:
   transmit the sidelink control information message comprising a bit indicating whether the second transport block format of the slot aggregated packet includes a gap symbol, wherein a transport block size of the transport block in the retransmission is based at least in part on whether the second transport block format of the slot aggregated packet includes the gap symbol.

8. The apparatus of claim 1, wherein the instructions to transmit the sidelink control information message are executable by the one or more processors to cause the apparatus to:
   transmit the sidelink control information message comprising a bit indicating whether the second transport block format of the slot aggregated packet includes a sidelink feedback channel, wherein a transport block size of the transport block in the retransmission is based at least in part on whether the second transport block format of the slot aggregated packet includes the sidelink feedback channel.

9. The apparatus of claim 1, wherein the instructions to transmit the sidelink control information message are executable by the one or more processors to cause the apparatus to:
   transmit the sidelink control information message comprising a bit indicating a number of demodulation reference signals in the second transport block format of the slot aggregated packet.

10. The apparatus of claim 1, wherein the instructions to transmit the sidelink control information message are executable by the one or more processors to cause the apparatus to:
    transmit the sidelink control information message comprising one bit indicating a configuration for the first transport block format, the configuration indicating two or more of: whether the second transport block format of the slot aggregated packet includes one or more control channels, whether the second transport block format of the slot aggregated packet includes an automatic gain control symbol, whether the second transport block format of the slot aggregated packet includes a gap symbol, and whether the second transport block format of the slot aggregated packet includes a sidelink feedback channel.

11. The apparatus of claim 10, wherein the instructions are further executable by the one or more processors to cause the apparatus to:
transmit, to the second UE, control signaling indicating one or more configurations, wherein the one or more configurations comprise the configuration.

12. The apparatus of claim 1, wherein the instructions to transmit the sidelink control information message are executable by the one or more processors to cause the apparatus to:
transmit the sidelink control information message comprising an indication of a second modulation and coding scheme order associated with the retransmission of the transport block, wherein a first modulation and coding scheme order is associated with the slot aggregated packet.

13. An apparatus for wireless communications at a second user equipment (UE), comprising:
one or more processors;
one or more memories coupled with the one or more processors; and
instructions stored in the one or more memories and executable by the one or more processors to cause the apparatus to:
receive, from a first UE, a slot aggregated packet;
transmit, to the first UE, feedback indicating unsuccessful reception of a transport block of the slot aggregated packet;
receive, from the first UE and at least in part in response to the feedback, a sidelink control information message indicating a first transport block format for a retransmission of the transport block; and
receive, from the first UE, the retransmission of the transport block in accordance with the first transport block format, wherein the first transport block format of the retransmission of the transport block is different than a second transport block format of the slot aggregated packet.

14. The apparatus of claim 13, wherein the instructions to receive the sidelink control information message are executable by the one or more processors to cause the apparatus to:
receive the sidelink control information message comprising a bit indicating whether the second transport block format of the slot aggregated packet includes one or more control channels, wherein a transport block size of the transport block in the retransmission is calculated in accordance with the bit indicating whether the second transport block format of the slot aggregated packet includes one or more control channels.

15. The apparatus of claim 14, wherein the one or more control channels comprise one or more of a sidelink control channel, a sidelink control channel demodulation reference signal, and a second stage sidelink control information transmission.

16. The apparatus of claim 13, wherein the instructions to receive the sidelink control information message are executable by the one or more processors to cause the apparatus to:
receive the sidelink control information message comprising a bit indicating an absence of one or more control channels in the second transport block format of the slot aggregated packet, and wherein a number of sidelink shared channel resources in the first transport block format used to calculate a transport block size of the transport block in the retransmission is based at least in part on the absence of the one or more control channels.

17. The apparatus of claim 13, wherein the instructions to receive the sidelink control information message are executable by the one or more processors to cause the apparatus to:
receive the sidelink control information message comprising a bit indicating a size of one or more control channels of the second transport block format of the slot aggregated packet, wherein a transport block size of the transport block in the retransmission is calculated based at least in part on the size of one or more control channels of the second transport block format of the slot aggregated packet.

18. The apparatus of claim 13, wherein the instructions to receive the sidelink control information message are executable by the one or more processors to cause the apparatus to:
receive the sidelink control information message comprising a bit indicating whether the second transport block format of the slot aggregated packet includes an automatic gain control symbol, wherein a transport block size of the transport block in the retransmission is calculated based at least in part on whether the second transport block format of the slot aggregated packet includes the automatic gain control symbol.

19. The apparatus of claim 13, wherein the instructions to receive the sidelink control information message are executable by the one or more processors to cause the apparatus to:
receive the sidelink control information message comprising a bit indicating whether the second transport block format of the slot aggregated packet includes a gap symbol, wherein a transport block size of the transport block in the retransmission is calculated based at least in part on whether the second transport block format of the slot aggregated packet includes the gap symbol.

20. The apparatus of claim 13, wherein the instructions to receive the sidelink control information message are executable by the one or more processors to cause the apparatus to:
receive the sidelink control information message comprising a bit indicating whether the second transport block format of the slot aggregated packet includes a sidelink feedback channel, wherein a transport block size of the transport block in the retransmission is calculated based at least in part on whether the second transport block format of the slot aggregated packet includes the sidelink feedback channel.

21. The apparatus of claim 13, wherein the instructions to receive the sidelink control information message are executable by the one or more processors to cause the apparatus to:
receive the sidelink control information message comprising a bit indicating a number of demodulation reference signals in the second transport block format of the slot aggregated packet.

22. The apparatus of claim 13, wherein the instructions to receive the sidelink control information message are executable by the one or more processors to cause the apparatus to:
receive the sidelink control information message comprising one bit indicating a configuration for the first transport block format, the configuration indicating two or more of: whether the second transport block format of the slot aggregated packet includes one or more control channels, whether the second transport block format of the slot aggregated packet includes an automatic gain control symbol, whether the second transport block format of the slot aggregated packet includes a gap symbol, and whether the second transport block format of the slot aggregated packet includes a sidelink feedback channel.

23. The apparatus of claim 22, wherein the instructions are further executable by the one or more processors to cause the apparatus to:
receive, from the first UE, control signaling indicating one or more configurations, wherein the one or more configurations comprise the configuration.

24. The apparatus of claim 13, wherein the instructions to receive the sidelink control information message are executable by the one or more processors to cause the apparatus to:
receive the sidelink control information message comprising an indication of a second modulation and coding scheme order associated with the retransmission of the transport block, wherein a first modulation and coding scheme order is associated with the slot aggregated packet.

25. A method for wireless communications at a first user equipment (UE), comprising:
transmitting, to a second UE, a slot aggregated packet;
receiving, from the second UE, feedback indicating unsuccessful reception of a transport block of the slot aggregated packet;
transmitting, to the second UE and based at least in part on the feedback, a sidelink control information message indicating a first transport block format for a retransmission of the transport block; and
transmitting, to the second UE, the retransmission of the transport block in accordance with the first transport block format, wherein the first transport block format of the retransmission of the transport block is different than a second transport block format of the slot aggregated packet.

26. The method of claim 25, wherein transmitting the sidelink control information message comprises:
transmitting the sidelink control information message comprising a bit indicating whether the second transport block format of the slot aggregated packet includes one or more control channels, wherein a transport block size of the transport block in the retransmission is based at least in part on the bit indicating whether the second transport block format includes the one or more control channels.

27. The method of claim 26, wherein the one or more control channels comprise one or more of a sidelink control channel, a sidelink control channel demodulation reference signal, and a second stage sidelink control information transmission.

28. The method of claim 25, wherein transmitting the sidelink control information message comprises:
transmitting the sidelink control information message comprising a bit indicating an absence of one or more control channels in the second transport block format of the slot aggregated packet, and wherein a transport block size of the transport block in the retransmission is based at least in part on the absence of the one or more control channels.

29. The method of claim 25, wherein transmitting the sidelink control information message comprises:
transmitting the sidelink control information message comprising a bit indicating a size of one or more control channels of the second transport block format of the slot aggregated packet, wherein a transport block size of the transport block in the retransmission is based at least in part on the size of one or more control channels of the second transport block format of the slot aggregated packet.

30. A method for wireless communications at a second user equipment (UE), comprising:
receiving, from a first UE, a slot aggregated packet;
transmitting, to the first UE, feedback indicating unsuccessful reception of a transport block of the slot aggregated packet;
receiving, from the first UE and at least in part in response to the feedback, a sidelink control information message indicating a first transport block format for a retransmission of the transport block; and
receiving, from the first UE, the retransmission of the transport block in accordance with the first transport block format, wherein the first transport block format of the retransmission of the transport block is different than a second transport block format of the slot aggregated packet.

* * * * *